March 30, 1954  W. J. COX  2,673,591
DETACHABLE CENTER ARMREST FOR AUTOMOBILE SEATS
Filed Nov. 21, 1952
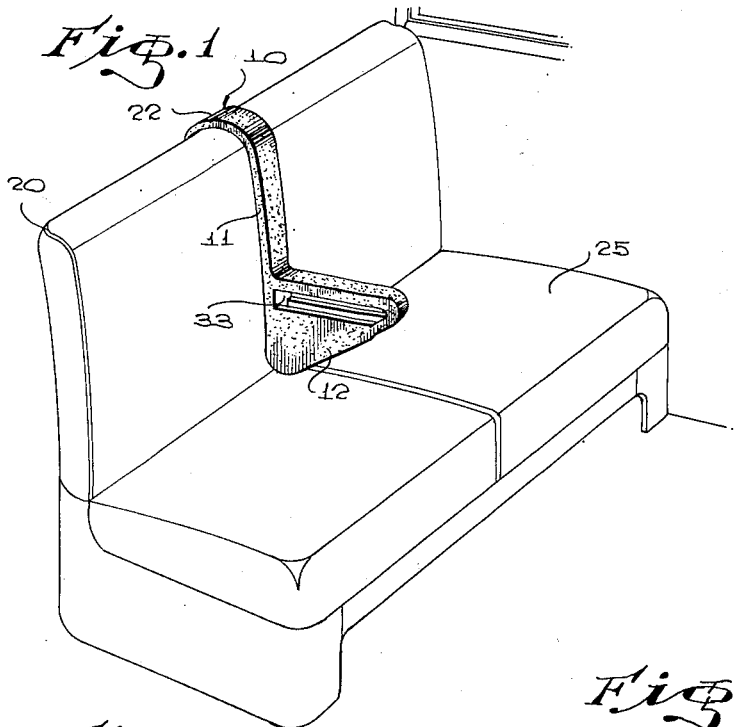
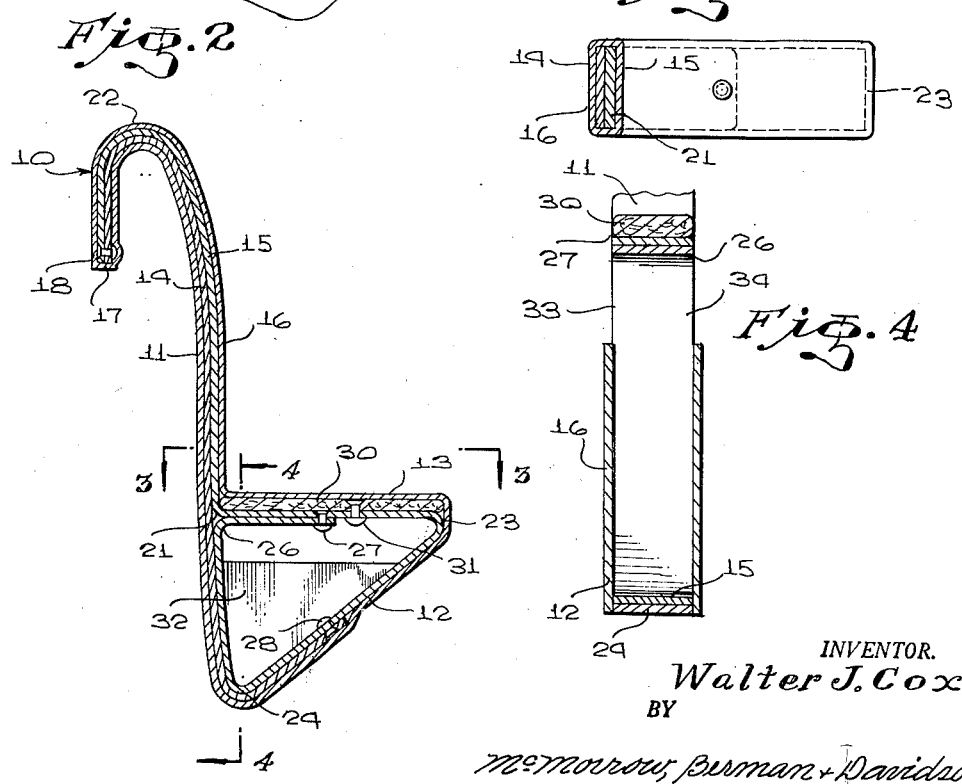
INVENTOR.
Walter J. Cox,
BY
McMorrow, Berman + Davidson
ATTORNEYS Patented Mar. 30, 1954

2,673,591

UNITED STATES PATENT OFFICE 2,673,591

DETACHABLE CENTER ARMREST FOR AUTOMOBILE SEATS

Walter J. Cox, Amarillo, Tex.

Application November 21, 1952, Serial No. 321,781

3 Claims. (Cl. 155—112)

This invention relates to center arm rests for automobile seats and more particularly to an arm rest adapted to be mounted on the back of the front seat of an automobile intermediate the width of the seat to provide an arm rest for the inner or right-hand arm of a person driving the automobile.

It is among the objects of the invention to provide a center arm rest for an automobile seat which can be mounted on the back of the seat and will provide an arm rest projecting outwardly from the seat back at a location for comfortably supporting one arm of a person riding in the seat or driving the automobile; which can be quickly mounted on and removed from an automobile seat back and can be easily adjusted to fit seat backs of different sizes and shapes; which can be operatively mounted on one part of a divided seat back and does not interfere with the folding movements of the seat back part on which it is mounted; which includes a pocket or compartment for storing small objects; and which is simple and durable in construction, economical to manufacture, easy to use, and neat and attractive in appearance.

Other objects and advantages will become apparent from a consideration of the following description and the appended claims in conjunction with the accompanying drawing wherein:

Figure 1 is a perspective view of an automobile seat showing an arm rest illustrative of the invention mounted thereon;

Figure 2 is a longitudinal medial, cross sectional view of the arm rest illustrated in Figure 1;

Figure 3 is a transverse cross sectional view on the line 3—3 of Figure 2; and

Figure 4 is a fragmentary cross sectional view on the line 4—4 of Figure 2.

With continued reference to the drawing, the portable or detachable arm rest, generally indicated at 10, includes an elongated structure 11 of bendable material longitudinally curved to fit over the top and along the front surface of the back of an automobile seat and a support structure 12 which extends from one end of the structure 11 and includes a portion 13 projecting substantially perpendicularly from the elongated structure 11 intermediate the length of this structure and having an outer surface constituting an arm rest.

The two structures 11 and 12 are formed together and are provided by a pair of elongated strips 14 and 15 of suitable sheet metal disposed in mutually superposed relationship and coterminous relationship at one end of the structure 11, and a cover 16 of suitable flexible material, such as textile fabric, covering the metal strips.

The metal strips 14 and 15 may have a width of approximately two inches and are preferably formed of readily bendable sheet material, such as sheet steel or aluminum. At the end 17 of the structure 11 the strips 14 and 15 are coterminous and are secured together by suitable means, such as rivets 18, and are longitudinally curved to fit over the top portion and along the front surface of the back of an automobile seat, as indicated at 20 in Figure 1.

The strip 15 extends along the strip 14 to a location 21 which is at a location slightly below the proper position for an arm rest when the U-shaped end portion 22 of the structure 11 is hung on the top portion of a seat back and, at the location 21 the strip 15 is given a substantially right angular bend, so that it extends almost perpendicularly away from the strip 14. At a location 23 spaced along the perpendicularly extending portion of the strip 15 from the strip 14 a distance equal to the desired length of the arm rest, the strip 15 is given another bend to an included angle of approximately 45-degrees and from the location 23 the strip 15 extends downwardly and toward the seat back relative to the operative position of the arm rest on the seat back, as illustrated in Figure 1, to a location 24 which is adjacent the juncture between the back portion 20 and seat portion 25 of the automobile seat. At the location 24 the strip 15 is given another bend, so that the angle included between the portions of the strip at the opposite sides of this bend is approximately 45-degrees and from the bend 24 is extended along the strip 14 to a location 26 adjacent the location 21 at which this strip was originally bent outwardly from the strip 14. At the location 26 the strip 15 is given another substantially right angular bend and extends along the portion of this strip between locations 21 and 23 to a position intermediate the distance between these locations where it is secured to the portion of the same strip originally bent outwardly from the strip 15 by suitable means, such as the rivets 27.

The metal strip 14 extends from the end 17 along the strip 15 past the locations 21 and 26 and around the bend in the strip 15 at the location 24. It then extends from the location 24 along the portion of the strip 15 between the locations 24 and 23 part-way of the distance between these locations and is secured at its end to the strip 15 by a rivet 28.

An arm rest bar 30, preferably formed of wood, is placed on the portion of the strip 15 extending from the location 21 to the location 23 and has a length substantially equal to the distance between these locations. This bar is secured to the portion of the strip 15 between locations 21 and 23 by suitable means, such as the rivet 31, and this bar 30 is spaced from the location 22 along the structure 11 a distance such that when the U-shaped end portion of the structure 11 extends over the top of a seat back, the bar 30 will be supported at an elevation providing a comfortable arm rest for a person riding on the associated seat.

The cover 16 is wrapped around the structure 11 and secured thereto by suitable means, such as stitching or gluing, and also extends entirely around the structure 12 to provide within this structure a compartment 32 of triangular shape. The cover overlying the sides of the structure 12 is provided at opposite sides of this structure and adjacent the arm rest bar 30 with elognated openings 33 and 34 providing access to the compartment 32 from the top of the compartment.

The structure may be mounted on a continuous seat back and positioned intermediate the width of the seat to provide a comfortable rest for the adjacent arm of a person riding on the seat, and may also be positioned on one part of a divided seat back near the end of such part adjacent the other part, and is particularly adapted to be mounted on the driver's part of a divided front seat back to provide an arm rest for the inner or right-hand arm of the driver. The inclination of the portion of the strip 15 between the locations 23 and 24 permits the part of the divided seat on which the arm rest is supported to be tilted forwardly or folded to provide access to the rear compartment of the automobile without interference by the arm rest.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claimed is:

1. A detachable arm rest for an automobile seat comprising strips of bendable sheet material coterminous at one end of said arm rest and superposed along a portion of their length from said one end to provide an elongated structure, one of said strips being bent substantially perpendicularly outward from the other strip at the end of said elongated structure remote from the coterminous ends of said strips to provide an arm rest support and being bent at a location spaced from said other strip toward said other strip at a location along the latter spaced from the first mentioned bend a distance substantially equal to the distance between said first mentioned and the second mentioned bend and then bent to extend along said other strip and along the portion of said one strip between said first mentioned and said second mentioned bends in said one strip to provide a support structure of triangular shape at the end of said elongated structure remote from the coterminous ends of said strips, an arm rest bar disposed on the portion of said one strip between said first mentioned and said second mentioned bends therein, and a cover enclosing said elongated structure, said triangular structure and said bar, said elongated structure being longitudinally curved to fit over the top and along the front surface of an automobile seat back.

2. A detachable arm rest for an automobile seat comprising strips of bendable sheet material coterminous at one end of said arm rest and superposed along a portion of their length from said one end to provide an elongated structure, one of said strips being bent substantially perpendicularly outward from the other strip at the end of said elongated structure remote from the coterminous ends of said strips to provide an arm rest support and being bent at a location spaced from said other strip toward said other strip at a location along the latter spaced from the first mentioned bend a distance substantially equal to the distance between said first mentioned and the second mentioned bend and then bent to extend along said other strip and along the portion of said one strip between said first mentioned and said second mentioned bends in said one strip to provide a support structure of triangular shape at the end of said elongated structure remote from the coterminous ends of said strips, an arm rest bar disposed on the portion of said one strip between said first mentioned and said second mentioned bends therein, and a cover enclosing said elongated structure, said triangular structure and said bar, said elongated structure being longitudinally curved to fit over the top and along the front surface of an automobile seat back, and the bottom portion of said triangular structure being inclined for tilting of a part of a divided seat back on which said arm rest is mounted.

3. A detachable arm rest for an automobile seat comprising strips of bendable sheet material coterminous at one end of said arm rest and superposed along a portion of their length from said one end to provide an elongated structure, one of said strips being bent substantially perpendicularly outward from the other strip at the end of said elongated structure remote from the coterminous ends of said strips to provide an arm rest support and being bent at a location spaced from said other strip toward said other strip at a location along the latter spaced from the first mentioned bend a distance substantially equal to the distance between said first mentioned and the second mentioned bend and then bent to extend along said other strip and along the portion of said one strip between said first mentioned and said second mentioned bends in said one strip to provide a support structure of triangular shape at the end of said elongated structure remote from the coterminous ends of said strips, an arm rest bar disposed on the portion of said one strip between said first mentioned and said second mentioned bends therein, and a cover enclosing said elongated structure, said triangular structure and said bar, said elongated structure being longitudinally curved to fit over the top and along the front surface of an automobile seat back, and said cover providing a storage compartment within said triangular structure and having an opening therein providing access to said compartment.

WALTER J. COX.

References Cited in the file of this patent

UNITED STATES PATENTS

| Number | Name | Date |
|---|---|---|
| 1,463,293 | Paddock | July 31, 1923 |
| 2,086,244 | Smith | July 6, 1937 |
| 2,524,909 | Hines | Oct. 10, 1950 |
| 2,530,384 | Faggen | Nov. 21, 1950 |
| 2,560,791 | Fincher et al. | July 17, 1951 |
| 2,642,926 | Diamond | June 23, 1953 |